(12) United States Patent
Taylor et al.

(10) Patent No.: US 8,816,223 B2
(45) Date of Patent: Aug. 26, 2014

(54) FRY STATION WITH INTEGRAL PORTION WEIGHT SENSING SYSTEM AND METHOD

(75) Inventors: R. Earl Taylor, Selbyville, DE (US); William Bruce, Ocean View, DE (US)

(73) Assignee: Restaurant Accuracy Systems, LLC, Selbyville, DE (US)

(*) Notice: Subject to any disclaimer, the term of this patent is extended or adjusted under 35 U.S.C. 154(b) by 73 days.

(21) Appl. No.: 12/678,480

(22) Filed: Dec. 19, 2011

(65) Prior Publication Data

US 2013/0008725 A1 Jan. 10, 2013

Related U.S. Application Data

(63) Continuation of application No. PCT/US2009/064696, filed on Nov. 17, 2009.

(51) Int. Cl.
| | |
|---|---|
| A23L 1/00 | (2006.01) |
| A47J 37/00 | (2006.01) |
| A47J 37/12 | (2006.01) |
| G01G 19/52 | (2006.01) |
| G01G 21/22 | (2006.01) |
| G01G 15/00 | (2006.01) |

(52) U.S. Cl.
CPC .............. G01G 15/001 (2013.01); G01G 21/22 (2013.01); A47J 37/12 (2013.01)
USPC .............. 177/25.13; 99/334; 99/403; 99/486; 426/235; 426/438; 177/245

(58) Field of Classification Search
USPC ............ 99/334, 403, 486; 426/231, 235, 438; 177/25.11, 25.12, 25.13, 25.17, 245, 1, 177/45, 50; 702/173, 174
See application file for complete search history.

(56) References Cited

U.S. PATENT DOCUMENTS

| | | | |
|---|---|---|---|
| 2,368,655 A | 2/1945 | Fraps | |
| 3,845,897 A | 11/1974 | Buttery et al. | |
| 3,975,997 A | 8/1976 | DiPietro | |
| 4,428,179 A * | 1/1984 | Jordan et al. | 53/502 |

(Continued)

FOREIGN PATENT DOCUMENTS

WO 2010057147 A1 5/2010

OTHER PUBLICATIONS

WIPO, International Search Report for PCT/US2009/064696, Mar. 2, 2010.

(Continued)

*Primary Examiner* — Randy W Gibson
(74) *Attorney, Agent, or Firm* — J.A. McKinney & Assoc., LLC (57) ABSTRACT

A food portion preparation station has an integral portion weight sensing system configured for portion control. A fry ribbon with integral portion weight sensing includes a weight sensor and software to weigh individual orders of comestibles such as french fries in selected portion sizes and as the operator is adding comestibles to the container, an instant indication is provided on a display showing the operator that a full order or portion is delivered while avoiding unnecessary loss in excessive portions, thereby preserving the restaurant owner's profit margin. Comestibles are taken from a holding area and placed into a container having a selected portion size corresponding to an assigned weight. The fry ribbon structure incorporates the weight sensor and each weighed portion is moved laterally along the queue defined by ribbon area for retrieval and service to a customer.

18 Claims, 6 Drawing Sheets

(56) References Cited

U.S. PATENT DOCUMENTS

| | | | | |
|---|---|---|---|---|
| 4,821,820 | A | * | 4/1989 | Edwards et al. ............ 177/25.18 |
| 5,488,202 | A | * | 1/1996 | Baitz et al. .................. 177/25.15 |
| 5,811,740 | A | * | 9/1998 | Hamilton, Sr. ................ 177/144 |
| 5,883,336 | A | * | 3/1999 | Jones ......................... 177/25.17 |
| 5,937,386 | A | | 8/1999 | Frantz |
| 5,986,219 | A | * | 11/1999 | Carroll et al. ..................... 177/1 |
| 6,022,572 | A | | 2/2000 | Winter et al. |
| 7,612,302 | B2 | | 11/2009 | Tamkin et al. |
| 8,357,412 | B2 | * | 1/2013 | Dorsten et al. ................ 426/231 |
| 2003/0047603 | A1 | * | 3/2003 | Lustenberger et al. ....... 235/385 |
| 2007/0251397 | A1 | | 11/2007 | Dorsten et al. |
| 2008/0271927 | A1 | * | 11/2008 | Crain et al. ........................ 177/1 |
| 2010/0282520 | A1 | * | 11/2010 | Lucas et al. ....................... 177/1 |
| 2010/0282840 | A1 | * | 11/2010 | Henry ........................... 235/382 |
| 2013/0101709 | A1 | * | 4/2013 | Rader ........................... 426/231 |

OTHER PUBLICATIONS

WIPO, Written Opinion of International Searching Authority for PCT/US2009/064696, Mar. 2, 2010.

Mettler-Toledo, A300 Checkweigher Information Book, Mar. 11, 2010.

The Webstaurant Store, Edlund E-160 FF 10 lb. Digital Portion Scale with French Fry Platform, http://www.webstaurantstore.com/edlund-e-160-ff-10-lb-digital-portion-scale-with-french-fry-platform/333E160FF.html, Dec. 29, 2011.

Frialator, Model 40S Economy Tube-Fried Gas Fryers, May 2003.

Mettler-Toledo, Weighing Terminal IND439 check Manual, Mar. 2006.

TalTech, WinWedge and WinWedge Pro, www.taltech.com, Sep. 15, 2008.

* cited by examiner

FRY STATION WITH INTEGRAL PORTION WEIGHT SENSING SYSTEM AND METHOD

PRIORITY CLAIMS AND REFERENCE TO RELATED APPLICATIONS

This is a Continuation application which claims priority under 35 U.S.C. 120 and 35 U.S.C. 111(a) as the U.S. National Phase under 35 USC 371 of PCT/US09/64696, filed Nov. 17, 2009, and also claims priority to U.S. provisional patent application 61/193,317 filed Nov. 17, 2008, the entire disclosures of which are expressly incorporated herein by reference.

BACKGROUND OF THE INVENTION

1. Technical Field of the Invention

This invention relates to new methods and apparatus for a portion control system and method for apportioning cooked foods in a commercial food service or quick-service restaurant setting.

2. Description of the Background Art

Weight check systems are known in the prior art for checking a customer's order or for checking the contents of a bagged order to determine if it is correct. U.S. Pat. No. 5,937,386, entitled "Computerized method and system for fulfillment of an itemized food order from a quick-service restaurant menu" describes a system and method in which a customer's order is input into a computer system that is adapted to check for the correct food content by means of weighing the bagged order. The restaurant personnel are alerted by the computer system when the packaged order is either overweight or underweight when compared to a predetermined weight range for the total items ordered. While the system and method of the '386 patent is well suited for making sure the customer is given the proper items, it is not adapted specifically for portion control in the quick-service restaurant setting.

French fries are the most popular item served at most quick service or "fast food" restaurants. At one well-known fast food franchise organization, hundreds of millions of orders are sold each year. These Quick Service Restaurants ("QSRs") are renowned for quality control and training, which assure their customers of a consistent dining experience at restaurants across the globe. For French Fries, each QSR has established a selected weight (e.g., 2.6 ounces) as the average weight of a regular order of french fries, and the chain bases their pricing, margin and yield calculations around this performance.

Because of the inconsistent length of french fries, from under 2 inches to 6 inches, it is difficult for QSR store personnel to control portion size. Although stores have access to portion measuring scales for weighing individual servings, these scales are not regularly used, because they add extra steps to the production process, add complexity, and reduce efficiency during busy or peak serving periods.

The common outcome, verified by owners and others familiar with store operations, is that store personnel fill servings visually, leaving extra fries in each bag or carton to minimize customer complaints and speed operations, resulting in a 2-3% typical shortfall in yield. A typical store uses 400-500 pounds of frozen fries per day, translating to 1600-2000 orders served per day. Improving yield by 1% results in 16-20 more servings sold per day, and an increased daily profit of $19-26 per store, or over $600 per month. Therefore, improving French Fry yield represents the single most obvious, universal opportunity to improve the bottom line of QSR or "fast food" restaurants.

A solution is needed that accurately determines the portion size or weight for each serving, but only if that solution does not slow down service or the existing Fry preparation process.

Fresh, hot fries are typically prepared at a stainless steel "fry station". Each station consists of a "fry tub" containing 1 or 2 receptacle bins for temporary storage of hot fries, infrared heat lamps placed above the station for keeping the product hot (140-165 F), a shelf or shelves for retrieving paper serving containers of all 3 sizes, and a "fry ribbon." The fry Ribbon is a special metal grate/railing sitting above the tub, designed to hold individual servings, and for any dropped fries to fall through into the tub below. A typical fast food restaurant likely uses a fry station with features that have evolved over time and will likely continue to change. There are many different sizes and shapes as the design of fry ribbons have changed many times over the years and will continue to do so. The typical preparation and serving process is as follows:

1. Hot fries are dumped from the fryer basket into the tub;
2. The operator adds salt to the fries;
3. The operator places an empty pouch, bag or container on the fry ribbon or holds the container in their hand and uses a fry scoop to add the fries. The fry order (i.e., serving or portion) is weighed and adjusted, if need be. When no adjustment is needed (meaning the fry order meets standards for quality and weight), the order is placed (or slid) to one side (e.g., sliding the package along a surface laterally to the left) for "first in-first out" dispensing to the customer;
4. The operator repeats the process with the next empty container;
5. Each prepared serving sits on the fry ribbon. Operators typically place small servings in a horizontal row, with regular (or medium) servings and large servings in separate rows on the fry ribbon.
6. As more servings are prepared, the operator slides the prepared servings toward the left.
7. As a customer order is assembled for delivery to the customer, fry servings are picked from the left side (first-in, first-out procedure).

This procedure is so ingrained in training and personnel habits that the procedure must remain relatively undisturbed if QSR operators are to adopt any improvement in apparatus or methods for portion control. There is a need, therefore, for a convenient, flexible, inexpensive and unobtrusive system and method for automated weighing of individual packaged French fry servings or portions for use in a restaurant or fast food setting. It is noted that French fries are a foodstuff or comestible which is often prepared, cooked or fried is large quantities before being apportioned or packaged for (hopefully) immediate sale and delivery to the customer, and other foodstuffs present similar challenges. Thus, there is also a need for automated apportionment or weighing of individual packaged servings or portions of other comestibles for use in a restaurant or fast food setting. In order to meet this need, a system and method must permit a time-efficient and relatively fool-proof measurement method and apparatus, ensuring that the customer receives the correct quantity of product and avoiding excessive portions, which diminish profit levels for the restaurant.

SUMMARY OF THE INVENTION

The background summarized above is related to the present invention and explains the context of the present invention. In this regard, it is instructive to also consider the objects and advantages of the present invention.

It is an object of the present invention to provide novel methods for providing a time-efficient and reliable measurement method and apparatus, ensuring that the customer receives the correct quantity of product while avoiding excessive portions, which diminish profit levels for the restaurant.

It is also an objective of the present invention to improve upon the profit levels for the restaurant by providing a convenient, flexible, inexpensive and unobtrusive system and method for automated apportioning or weighing of individual packaged foodstuff servings or portions in a Quick Service Restaurant ("QSR") or fast food setting.

The system and method of the present invention provides a time-efficient measurement, ensuring that the customer receives the correct quantity of product while avoiding excessive portions, which diminish profit levels for the restaurant.

An exemplary embodiment adapted for use with French fries will be described, but this embodiment illustrates principals and features which are readily adapted for use with other foodstuffs which are typically cooked (e.g., fried, baked, steamed or boiled) in significant quantities immediately before being divided into individual portions and sold in portable containers.

In accordance with the present invention, a fry ribbon system with integral portion weight sensing includes a weight sensor and software to weigh individual orders of French Fries in selected portion sizes, so that a full order or portion is delivered to the customer while avoiding unnecessary loss in excessive portions, thereby preserving the restaurant owner's profit margin. Fries are moved using a scoop, taken from a holding area and placed into a container having a selected portion size, corresponding to an assigned weight. The fry ribbon structure incorporates the weight sensor and each weighed portion is then moved along the queue under the heat lamps for retrieval and service to a customer or consumer.

The weight sensing portion, being integrated into the fry ribbon structure, can be connected by wires or can be adapted for wireless communication with a computer or terminal which is also configured to provide visible or audible indication that a given portion is (a) correct, (b) too light or (c) too heavy. The portion control terminal or computer is also configured to store the weight sensor data, logging that data over time, and is programmed to provide reports on portion size, related statistics, profit/loss information and loss prevention information to restaurant managers.

The Fry Scale or weight sensor's requirements include adaptations for the environment. Specifically, the system must operate for extended intervals while hot, because the fry ribbon temperature is usually maintained at around 160° F. from heat lamps. There is also continuous exposure to salt and frying oil or grease, which essentially impregnates the fry ribbon work area. The system must comply with NSF certification requirements and regular cleaning is required; immersion is not necessary but a water rinse with a detergent wipe down is likely to be performed on a daily basis. The weigh-sensing portion is preferably configured as a removable bridge or module configured to be easily moved from a fry tub (e.g., to a sink for cleaning), without tools. The system's human interface must be easily viewed by a fry station operator and by a manager standing 4-6 feet behind the operator.

As noted above, while the present invention will be described for the handling of French fries, it should be understood that it is equally applicable with no significant modifications to the handling of a wide variety of fried comestibles including chicken nuggets, clam strips, fried shrimp, and onion rings which are cooked in bulk immediately before being divided into individual portions and sold in portable containers.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENTS AND BEST MODES FOR CARRYING OUT THE INVENTION

Before explaining exemplary embodiments and methods of the present invention in detail, it is to be understood that the invention is not limited in its application to the details of construction and to the arrangements of the components set forth in the following description or illustrated in the Figures. The invention is capable of other embodiments and of being practiced and carried out in various ways. Also, it is to be understood that the phraseology and terminology employed herein are for the purpose of description and should not be regarded as limiting.

Referring to FIGS. 1-8, as discussed above, a fry station system 100 with integral portion weight sensing includes a weight sensor (e.g., such as one or more load cells generating a weight signal in response to a sensed food portion and a controller or computer pre-programmed with software to weigh individual orders of French fries in selected portion sizes) so that a full order or portion is delivered to the customer while avoiding unnecessary loss in excessive portions, thereby preserving the restaurant owner's profit margin.

As noted above, while the exemplary embodiments illustrated herein are described for the handling of French fries, it should be understood that the system and method of the present invention are equally applicable with no significant modifications to the handling of a wide variety of fried comestibles including chicken nuggets, clam strips, fried shrimp, and onion rings, when served in quick service food containers or packages having uniform dimensions. For example, french fries, onion rings, clam strips or other comestibles can be served in a plurality of designated portion sizes where, optionally, each portion size has a unique container, bag or carton. An exemplary carton is shown in U.S. Pat. No. 3,845,897 (incorporated herein by reference) which describes and illustrates a food container adapted to provide walls (e.g., panel member 401) and a base (bottom 407) which can be opened to stand erect before or after filling. Paper sacks or pouches can also be readily constructed to contain and support properly sized portions of comestibles. Container 112 (as best seen in FIGS. 1, 3, 4 and 7) can be a container such as is described in the '897 patent, above, or of the type typically used in Quick Service Restaurants ("QSRs") or other high volume or commercial food service establishments delivering controlled portions of freshly prepared foods in portable containers.

Figure 1:
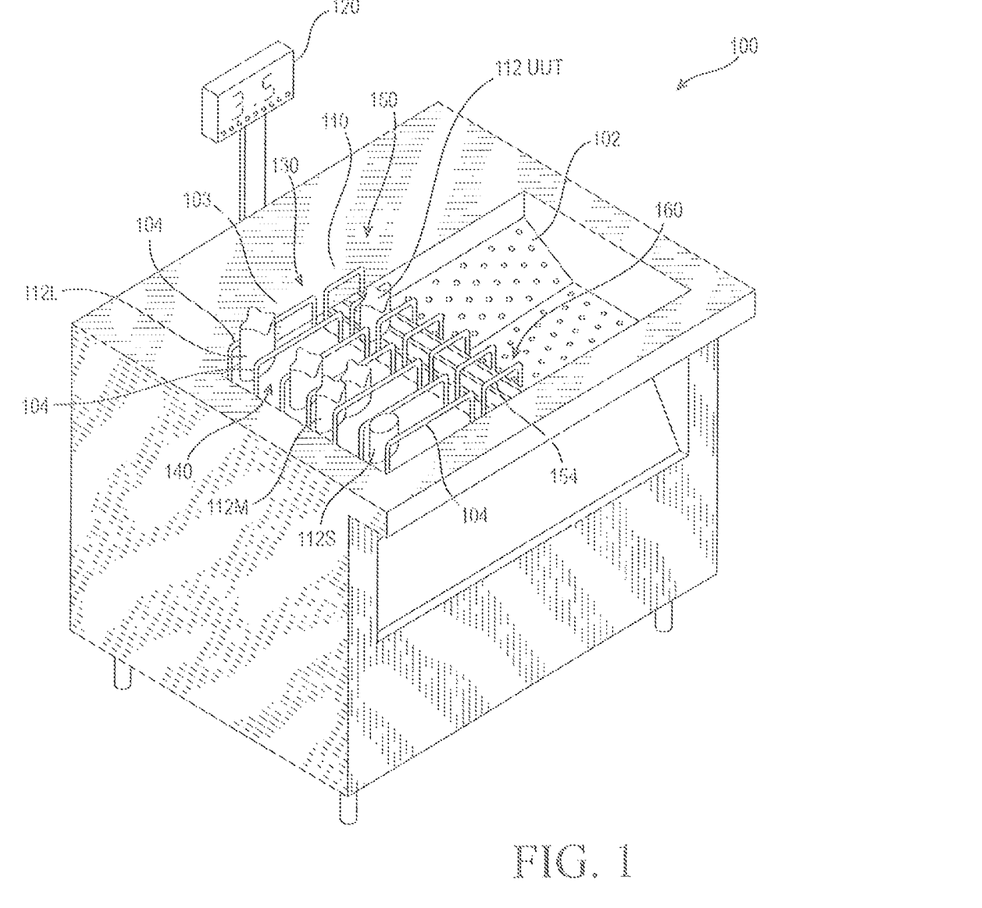
FIG. 1 is a perspective view illustrating a fry station with a first embodiment of the ribbon scale portion weight sensing system, in accordance with the present invention.

FIG. 1 shows fry station 100 of this invention with fry ribbon staging area 103 and ribbon scale 110 immediately adjacent to fry ribbon staging area 103 and atop a portion of fry tub 102. Fry tub 102 is configured to receive hot comestibles directly from a cooking (e.g., frying) process, where the comestibles can be seasoned and drained immediately after cooking and before apportionment.

As will be described in greater detail below, fry station 100 has an arrangement which is well suited for use with a deep fat fryer which can be advantageously positioned beside (e.g., on the right side) of the fry station, proximate the fry tub 102.

Fry portion containers of three different sizes (112S, 112M and 112L) are shown in several rows of fry ribbon 103. One container 112UUT is shown on ribbon scale 110, and can be referred to as the Unit under Test ("UUT"). Output display 120 is configured and placed to show the weight of the portion in 112UUT on ribbon scale 110 and is mounted on a vertical column support projecting up from the back wall of the fry station cabinet and is mounted at a selected height (e.g., 40-72 inches above the floor) for ease of viewing by a standing fry station operator and by a standing QSR manager who may be six (6) feet away and behind the standing operator. Alternatively, display 120 can be anywhere in the area within convenient viewscape of the fry station operator and the manager. Vertically projecting support rails or bars 104 keep containers (e.g., 112M) supported in a substantially upright position on fry ribbon 103.

Referring again to FIG. 1, fry station 100 has an upper work surface or counter-top surface which defines a fry ribbon portioning work area 130, and the left-most portion of work area 130 defines a queue area and includes a plurality of vertically projecting support fence or wall segments configured with rails or bars 104 to keep the containers 112S, 112M, 112L upright on fry ribbon 103. In the illustrated embodiment, a plurality (e.g., seven) of substantially parallel rails 104 define wall or fence segments that are spaced at selected intervals (e.g., 2-4 inches) from one another; and the interval or distance between adjacent parallel rails define receiving channels 140 which are dimensioned to accommodate the selected containers (112S, 112M, 112L) in a desired arrangement on the fry ribbon portioning work area 130. In the embodiment illustrated in FIG. 1, the seven parallel rails 104 define therebetween an array of six (6) receiving channels 140 which, as shown, support filled containers in an upright position or orientation, thereby ensuring that the portioned servings remain intact.

Ribbon scale 110 has an upper work surface which defines a weighing area 150 that also includes a plurality of vertically projecting support fence or wall segments configured with rails or bars 154 to keep the containers 112S, 112M, 112L upright on fry ribbon 103. In the illustrated embodiment (of FIGS. 1 and 7), a matching plurality (of seven) substantially parallel rails 154 define wall or fence segments that are spaced at the same selected intervals (e.g., 2-4 inches) from one another to align with rails 104 in the queue area 130; and the interval or distance between adjacent parallel rails define receiving channels 160 which are dimensioned to align with channels 140 in the queue area, when ribbon scale 110 is placed in fry tub 102 and adjacent queue area of the fry ribbon portioning work area 130. The ribbon scale's rails 154 and channels 160 also accommodate the selected containers (112S, 112M, 112L) in a desired arrangement on the fry ribbon portioning work area 130. In the embodiment illustrated in FIG. 1, the seven parallel rails 154 define therebetween an array of six (6) receiving channels 160 which, as shown, support containers when being filled with a selected portion (e.g., 112UUT) in an upright position or orientation, thereby ensuring that the portioned serving remains intact while being filled.

The configuration of each rail (e.g., 104 and 154) and each receiving channel (e.g., 106 and 160) are dimensioned and aligned to ensure that individual comestible (e.g., French fry) servings in their individual packages or containers can easily slide laterally in a substantially linear (or curvilinear) motion from the weighing area 150 of ribbon scale 110 laterally toward the left ribbon area or queue area without any interference or disruption from an excessively large gap or discontinuity of the ribbon rails 104 and 154 or from a gap or interruption in the receiving channel 140 and 160. All of the foregoing components are preferably fabricated from a stainless steel alloy.

Figure 2:
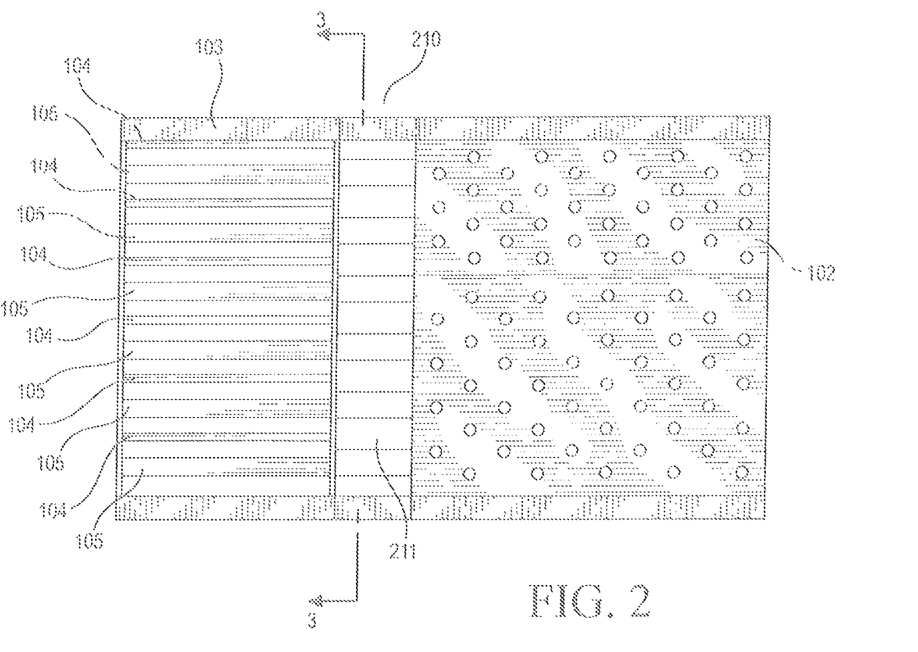
FIG. 2 is a top view detail illustrating the fry tub with a second embodiment of the portion weight sensing system (or ribbon scale) adjacent to the fry ribbon at its right side, in accordance with the present invention.
Figure 3:
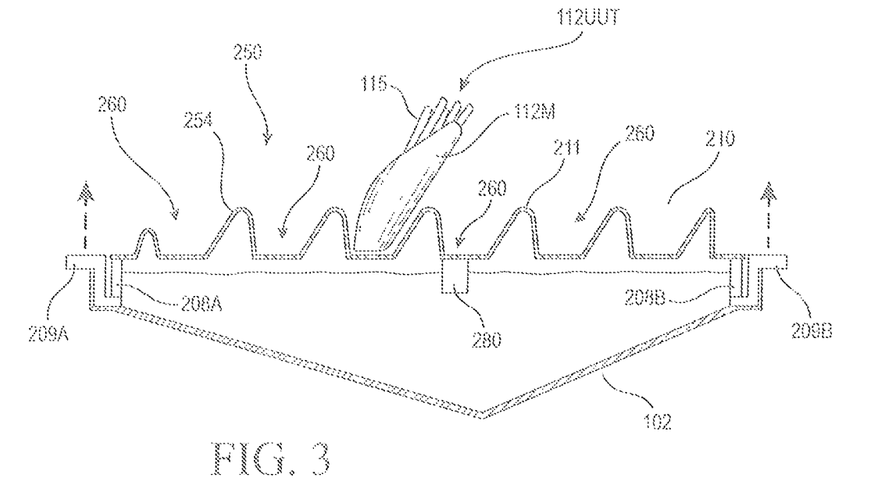
FIG. 3 is an end view cross-section illustrating the ribbon scale atop the fry tub taken at the location indicated in FIG. 2, in accordance with the present invention.
Figure 4:
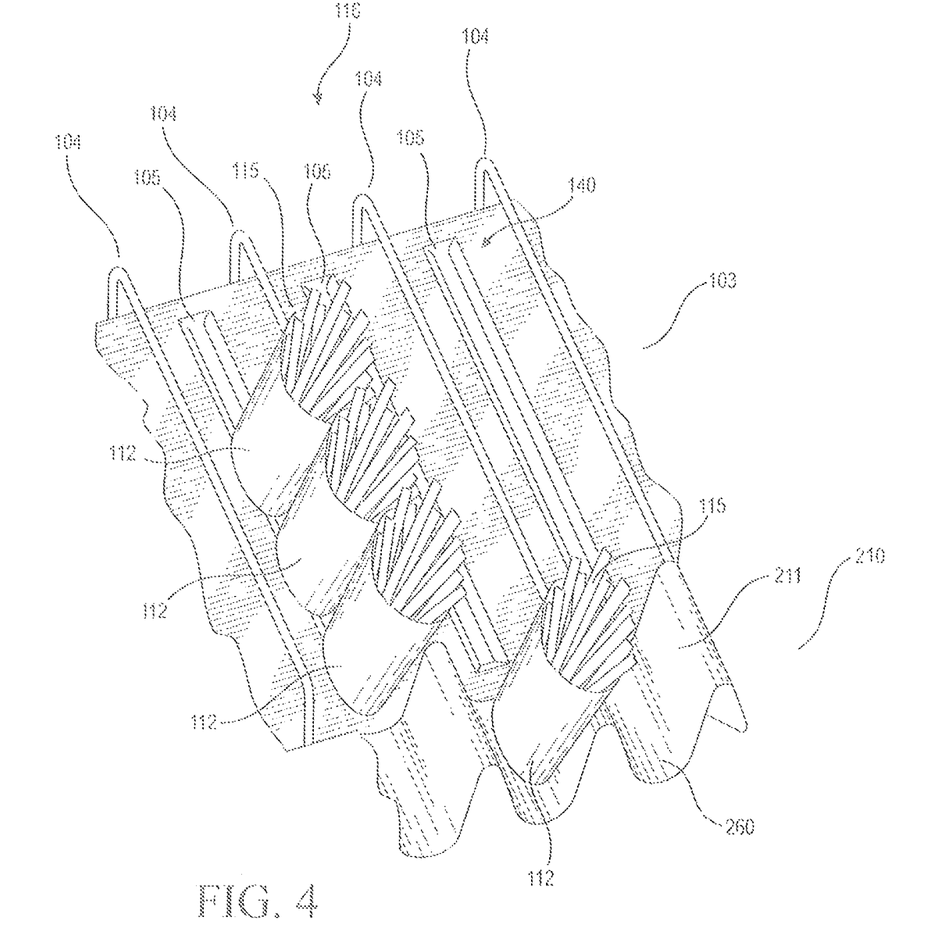
FIG. 4 is an enlarged perspective detail view illustrating a portion of the fry ribbon adjacent to a portion of the ribbon scale of FIGS. 2 and 3 with filled French fry containers, in accordance with the present invention.

FIGS. 2, 3 and 4 show details of a second embodiment of the present invention. FIG. 1 shows an embodiment of ribbon scale 110 which uses a plurality of parallel vertically projecting support bars 154 define an array of parallel receiving channels 160, and the embodiment of FIGS. 2, 3 and 4 illustrate a different embodiment which uses contoured continuous sheet metal top surface 211 to define ribbon scale 210's weighing area. This is a preferred embodiment which defines the rows and supports the containers 112 filled with fried comestibles (e.g., French fries) 115 as shown in the cross-section of FIG. 3.

Ribbon scale 210 has an upper work surface which defines a weighing area 250 that also includes a plurality of vertically projecting support fence or wall segments 254 to keep the containers (e.g., 112S, 112M, 112L) substantially upright before, during and after filling. In the illustrated embodiment (of FIGS. 2, 3 and 4), a matching plurality of substantially parallel wall or fence segments 254 are spaced at the same selected intervals (e.g., 2-4 inches) from one another and provide angled support surfaces which align with the rails 104 in the fry station's queue area 130; and the interval or distance between adjacent parallel rails define spaced receiving channels 260 which are dimensioned to align with channels 140 in the fry station's queue area, when ribbon scale 210 is placed in the fry station's fry tub 102 and adjacent queue area of the fry ribbon portioning work area 130. The ribbon scale's wall or fence segments 254 and channels 260 also accommodate the selected containers (112S, 112M, 112L) in the desired arrangement for use with the fry ribbon portioning work area 130. In the embodiment illustrated in FIG. 3, the parallel fence or wall segments 254 define therebetween an array of six (6) receiving channels 260 which, as shown, support containers (e.g., 112M) when being filled with a selected portion (e.g., 112UUT) in a substantially upright position or orientation, thereby ensuring that the portioned serving remains intact while being measured (i.e., weighed) and filled.

The configuration of each wall or fence segment (e.g., 104 and 154) and each receiving channel (e.g., 106 and 160) are dimensioned and aligned to ensure that individual comestible (e.g., French fry) servings in their individual packages or containers can easily slide laterally in a substantially linear (or curvilinear) motion from the weighing area 250 of ribbon scale 210 laterally toward the left ribbon area or queue area without any interference or disruption from an excessively large gap or discontinuity of the wall or fence segments 104 and 154 or from a gap or interruption in the receiving channels 140 and 260.

FIGS. 2 and 4 illustrate the configuration of the surface of work area 130, which includes the parallel array of support bars 104 interleaved with the parallel receiving channels 140. In the illustrated embodiment, each receiving channel has defined therein a open center slot 105 which has a selected front to back width (e.g., 1 inch) dimensioned to permit stray comestibles (e.g., French fries) 115 to fall through into fry tub 102 below. The components of ribbon scale 210 are also preferably fabricated from a stainless steel alloy.

Each of the illustrated embodiments of the ribbon scale (i.e., 110 in FIG. 1 and 210 in FIG. 2) has a surface (111 or 211) with structural features dimensioned to define rows that are aligned to be in registration with those of work area 130 on fry ribbon 103 so that portions 112 can be just moved laterally or slid left from ribbon scale (e.g., 110 or 210) to the queue area of fry ribbon 103 after the comestible portion weighing sequence of steps is completed. Note that weighed portions 112 are served or retrieved from the left-most or opposing service end 116 (FIG. 4) for order fulfillment to maintain the proper age order of the portions on fry ribbon 103.

Configurations with one or more load cells or weight sensing elements can be used, but in the illustrated embodiment, the ribbon scale of the present invention (110 or 210 as shown in FIG. 3) is carried upon first and second load cells 208A, 208B each of which support an end or segment of rigid surface 211. First load cell 108A is mounted and configured to rest upon a proximal transverse supporting bracket 209A, which is supported at the proximal, front or first edge of fry tub 102. Similarly, second load cell 208B is mounted and configured to rest upon a distal transverse supporting bracket 209B, which is supported at the distal, rear or second opposing edge of fry tub 102. In the embodiment illustrated in FIG. 3, each load cell (208A and 208B) generates a weight signal in response to force exerted onto surface 211 when transverse supporting brackets 209A and 209B are supported, and the first load cell weight signal and the second load weight cell signal are preferably modulated and transmitted to a controller 300 configured to receive the signals using a battery powered data telemetry sending unit or wireless data transmitter 280 which is mounted on the ribbon scale in a protected location that will not interfere with use of the ribbon scale for portion weighing.

In this way, the ribbon scale of the present invention (110 or 210) can be easily lifted up from atop fry tub 102 for cleaning or service. Note that if surface 211 is not sufficiently rigid to act as a bridge member as shown, reinforcing support rails across the bottom surface can be added. In using two load cells 208A and 208B, the proper weight of a filled container 112 in any row of ribbon scale 110 is sensed and computed obtained by summing the indications of the two load cells and then subtracting the tare weight (i.e., the constant weight of supporting structure).

In use, fried comestibles 115 are moved using a scoop (or a scoop-shaped container) from a holding area (e.g., fry tub 102) and the comestibles are placed into a container (e.g., 112S, 112M or 112L) having a selected portion size, corresponding to an assigned weight. The portion under test (112UUT) is adjusted for weight on the ribbon scale (110 or 210), and after a portion is deemed to be correctly apportioned, that weighed portion is then moved laterally along the channel and into the queue area which is preferably under the heat lamps (not shown) for retrieval and service to a customer or consumer.

Figure 5:
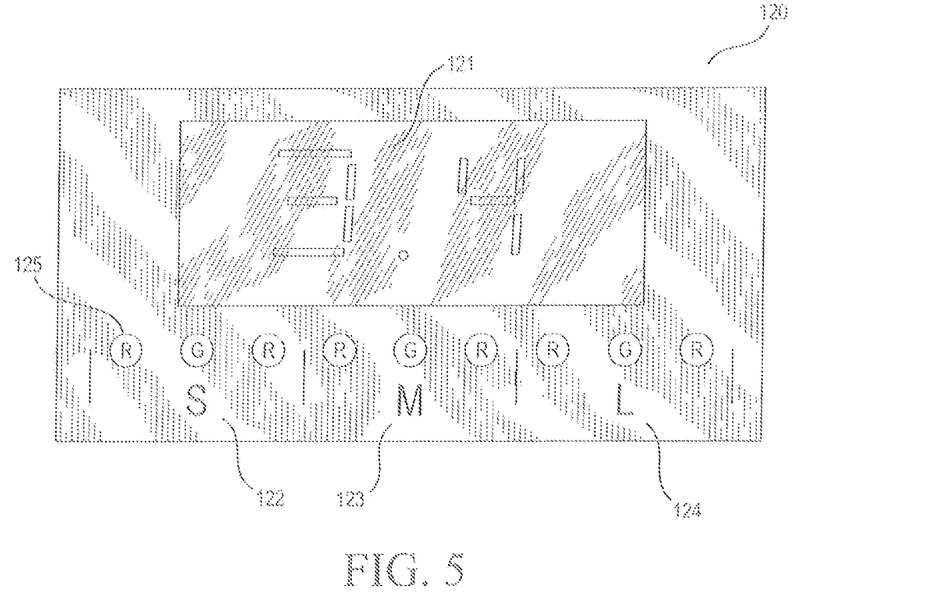
FIG. 5 is a front elevation view illustrating a portion control output display, in accordance with the present invention.

The load cells or weight sensors (e.g., 208A, 208B) generate a weight signal in response to a product portion being placed on the portion supporting surface (e.g., 211), and the weight sensing area 250 of the ribbon scale is therefore used as an integral part of the fry ribbon structure's fry ribbon portioning work area (as shown in FIGS. 1-7). The weight sensors can optionally transmit the portion weight signal over connected wires or the weight signal can be transmitted via wireless communication to controller 300. The computer or controller 330 is configured and programmed to provide visible or audible indication in response to the weight signal. More specifically, the computer or controller 300 is preferably programmed (e.g., via keypad or data input 330 and configured to provide an indication of three possible states, namely, (1) that a given portion (112UUT) on the ribbon scale now has a weight within pre-defined tolerances, (2) that a given portion on the ribbon scale is too light or (3) that a given portion on the ribbon scale is too heavy (where the visible indicia of these states is generated in e.g., indicator 120, as shown in FIGS. 1 and 5).

The fry station system 100 includes a portion control terminal, controller or computer (e.g., 300) is preferably also configured to store the weight sensor data, logging that weight sensor data over time, and is programmed to provide reports on portion size, related statistics, profit/loss information and loss prevention information.

As best seen schematically in FIG. 3, ribbon scale (e.g., 110 or 210) preferably includes at least one load cell, scale or weight sensor adapted for use in the QSR or fast food environment. Specifically, the scale system (e.g., 110 or 210) must operate for extended intervals while Hot, because the fry ribbon temperature is usually maintained at around 160° F. from heat lamps. The fry station environment also provides continuous exposure to salt, other flavorings and frying oil or grease, which essentially impregnates the fry ribbon work area. The system (e.g., 110 or 210) must comply with National Sanitation Foundation ("NSF") and ANSI certification requirements and regular cleaning is required; immersion is not necessary but a water rinse with a detergent wipe down is likely to be performed on a daily basis. The weigh module (e.g., 110 or 210) must be easily moved from fry tub 102 to a sink for cleaning, without tools and the system's human interface display 120 must be easily viewed by a fry station operator and by a manager standing 4-6 feet behind the operator.

Turning now to the features of an exemplary embodiment: As best seen in FIG. 3, ribbon scale system 210 has load cell elements 208A, 208B supporting the ribbon scale on parallel proximal and distal transverse rectangular beams 209A, 209B. Either embodiment of the ribbon scale (110 or 210) is preferably used as bridge spanning the fry tub area 102 and so is as long (front to back) as the front to back distance for the fry tub opening (e.g., approximately 20 inches) and is approximately one container's width (e.g., 112L) wide (e.g., approximately four inches wide). For a typical fry station configuration, the scale weighing area (150 or 250) is preferably integrated into the right-most four inches of the fry ribbon portioning work area, so the upward facing surface area of the scale (150 or 250) measures roughly four inches wide by twenty 20 inches deep, within a fry ribbon portioning work area 130 that spans 16 inches wide×20 inches deep.

For a second style of fry station embodiment, the ribbon portioning work area is wider but not as deep, front to back. In this second or alternative embodiment (not shown) the scale weighing area is integrated into the right-most 4 inches of the fry ribbon portioning work area, so the scale measures roughly 4 in wide×6 inches deep within a ribbon portioning work area that spans 36 inches wide×6 inches deep.

The individual comestible (e.g., French fry) servings must be portioned into individual packages or containers which easily slide from the weighing area laterally toward the left ribbon area without any interference or disruption from a discontinuity of the ribbon railings 108 or interruption receiving channels defined there-between.

An exemplary human interface or visible indicator display 120 is shown in FIG. 5. A digital display preferably includes a seven-segment alpha-numeric portion size or weight indication 121 which is configured to be easily legible from 6 feet away. In addition, for enhanced ergonomics and speed of operation and user comprehension, an analog color indicator array (similar to a digital speedometer with a band of LED display segments) is energized from left to right as the serving size weight increases. Alternatively, a row of individual LED indicators 25 as illustrated can be used. Referring again to the embodiment illustrated in FIG. 5, display 120 preferably includes a linear array or band of red indicators such as LEDs used in a progressively illuminated array to show increasing weight, in response to an increasing weight signal being transmitted by the controller or computer 300. In the illustrated embodiment, a plurality of arrays (e.g., 3) are provided for a plurality of pre-programmed portion sizes (e.g., small "S", medium "M" and large "L") where each array comprises at least three LED indicators, in a color-coded sequence.

For the display embodiment illustrated in FIG. 5, a first array 122 is used to indicate the instantaneous weight or portion size for a "small" portion of comestibles and provides a first indicia (single left most red LED) during the initial time the operator is adding to the portion, and as the portion grows in size and weight, the weight sensor senses and generates an increasing weight sensor signal, which the controller is programmed to compare to pre-programmed portion metrics, and once the measured portion is sensed to be within acceptable tolerances for a "small" portion, a second indicia (central green LED) is illuminated. If the operator adds an excessive quantity of comestibles to the portion being sensed, a third indicia (right red LED) is illuminated, thereby alerting the operator that the portion being sensed is now too large or heavy.

Similarly, a second array 123 is used to indicate the instantaneous weight or portion size for a "medium" portion of comestibles and provides a first indicia (single left most red LED) during the initial time the operator is adding to the portion, and as the portion grows in size and weight, the weight sensor senses and generates an increasing weight sensor signal, which the controller is programmed to compare to pre-programmed portion metrics, and once the measured portion is sensed to be within acceptable tolerances for a "medium" portion, a second indicia (central green LED) is illuminated. If the operator adds an excessive quantity of comestibles to the portion being sensed, a third indicia (right red LED) is illuminated, thereby alerting the operator that the portion being sensed is now too large or heavy.

A third array 124 is used to indicate the instantaneous weight or portion size for a "large" portion of comestibles and provides a first indicia (single left most red LED) during the initial time the operator is adding to the portion, and as the portion grows in size and weight, the weight sensor senses and generates an increasing weight sensor signal, which the controller is programmed to compare to pre-programmed portion metrics, and once the measured portion is sensed to be within acceptable tolerances for a "large" portion, a second indicia (central green LED) is illuminated. If the operator adds an excessive quantity of comestibles to the portion being sensed, a third indicia (right red LED) is illuminated, thereby alerting the operator that the portion being sensed is now too large or heavy.

In the exemplary embodiment of FIG. 5, the 3 green LED segments are programmed to illuminate or be energized when the serving weight reaches the optimum weight for small 122, regular (or "medium") 123, and large 124 servings. In case there is a gap in weights between an "overfilled" small or medium serving and an "under filled" next larger size, the two adjacent red LED indicators will be lighted indicating ambiguity in deciding the intended portion size.

Preferably, controls (e.g., keypad 330) are hidden. A ZERO button may be provided for calibration. Other controls may be desired to calibrate the scale, to change default sizes of each serving type, to display in alternate units of measure (e.g., grams instead of ounces) and to enable or select from different audible indicia (e.g., a buzzer or a chime) generated by an audio transducer which is also responsive to the controller or computer 300.

In a preferred embodiment, the ribbon scale holds a maximum of 6 rows×1 serving, so an example for a maximum active load is 40 ounces, or 2.2 pounds. The dead load includes the ribbon surface structure, which weighs approximately 4 pounds. Scale capacity is 5 lb×0.1 oz and speed of response (weighing and display combined) is preferably approximately 0.5 seconds. Overload protection is required. The system, including the scale module (e.g., 110 or 210) is ruggedly constructed so that it can withstand being dropped from table height onto a concrete floor without damage. Preferably, calibration resides with scale module (e.g., 110 or 210), rather than the human interface or display module 120. A different scale (e.g., 110 or 210) preferably can be configured to work with the human interface module 120 without requiring calibration of the pair.

When in use, the Scale (e.g., 110 or 210) automatically acquires zero upon sensing stability. Next, the Scale (e.g., 110 or 210) begins a weighing operation and displays current weight during motion, and upon stability detection, if weight is within serving size weight limits; the scale engages green indicators for a selected display interval (e.g., 1 second). As the operator fills and then moves the apportioned serving containers, he or she slides them laterally from the active sensing scale surface (e.g., 150 or 250) and onto the ribbon surface queue area. Each scale (e.g., 110 or 210) is programmed to automatically re-acquire an initial zero reading once stability is detected. Portions of comestibles (e.g. french fries) 112 should not be moved by the operator when being weighed, because during the serving measurement operation, if any servings are moved from scale to ribbon, that movement may cause an incorrect weight reading to be displayed.

As noted above, each scale (e.g., 110 or 210) is preferably battery powered, or is configured with a quick disconnect from fry station so that the scale may be easily removed for cleaning and reattachment. A scale power supply including a rechargeable battery is preferred, with a minimum battery life of 18 hours and a full-recharge time of 6 hours.

The human interface display 120 can receive data wirelessly or by cable and is preferably mounted to the fry station as shown in FIG. 1 and described above. The human interface display 120 is preferably also battery powered, but can also obtain power from the same source as the scale (e.g., 110 or 210).

Figure 6:
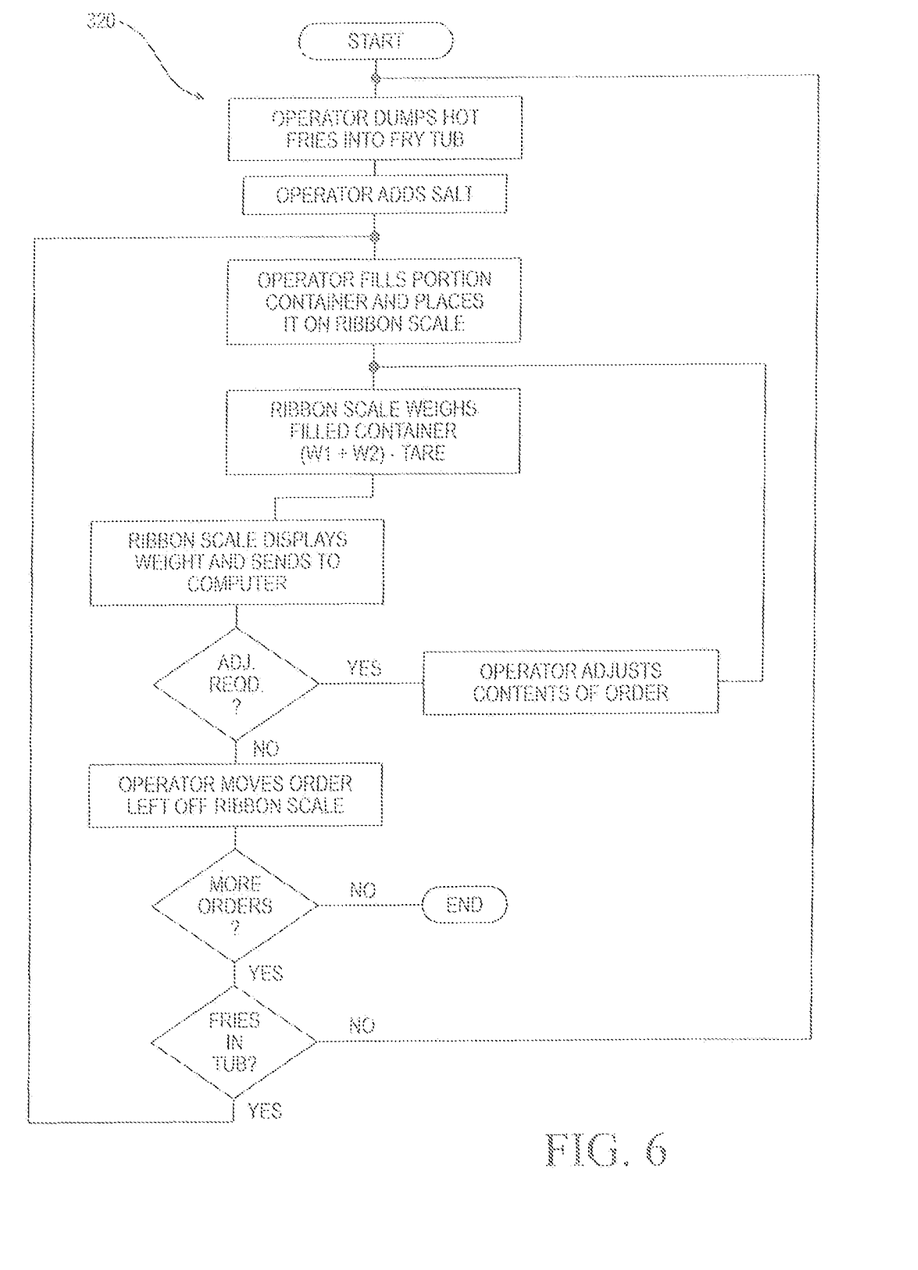
FIG. 6 is a flow chart illustrating a method of use of the fry station with the ribbon scale system, in accordance with the present invention.

FIG. 6 is a flow chart showing the interaction between the operator and fry station 101 of this invention in preparing comestible (e.g., fry) portions for order fulfillment. In accordance with the method of the present invention defined in program 320, the portion measuring and portion control process starts with measuring or entering a reference weight for the container (e.g., 112M) used to hold and serve the comestibles. In the present example, the container's weight is part of the "Tare." Tare weight, sometimes called unladen weight, is the weight of an empty container. By subtracting Tare from the gross measured weight (or laden weight), the weight of the goods carried (the net weight or actual comestible portion weight) is determined. The ribbon scale (e.g., 110 or 210) senses weight continuously and successive measurements are indicated in a series of weight measurements.

Fry tub 102 is loaded from the fryer basket. The operator initially places a first amount of comestibles into a selected container (e.g., 112M) and then the filled container is weighed, providing a first weight signal. The controller or computer 300 receives the first weight signal and compares it to a pre-programmed range of acceptable weights as part of program 320. If the portion is too heavy or too light, then the controller indicates that adjustment of the portion size is required (e.g., using the display of FIG. 5) and the operator, in response, adds comestibles to or takes comestibles from the portion being sensed (112UUT) until the portion being sensed is determined to be within the pre-programmed range of acceptable weights.

The properly sized container of comestibles 112 is then moved laterally from the universal ribbon scale's sensing area (150 or 250) and onto the ribbon queue staging or serving area 103 on the left.

Figure 7:
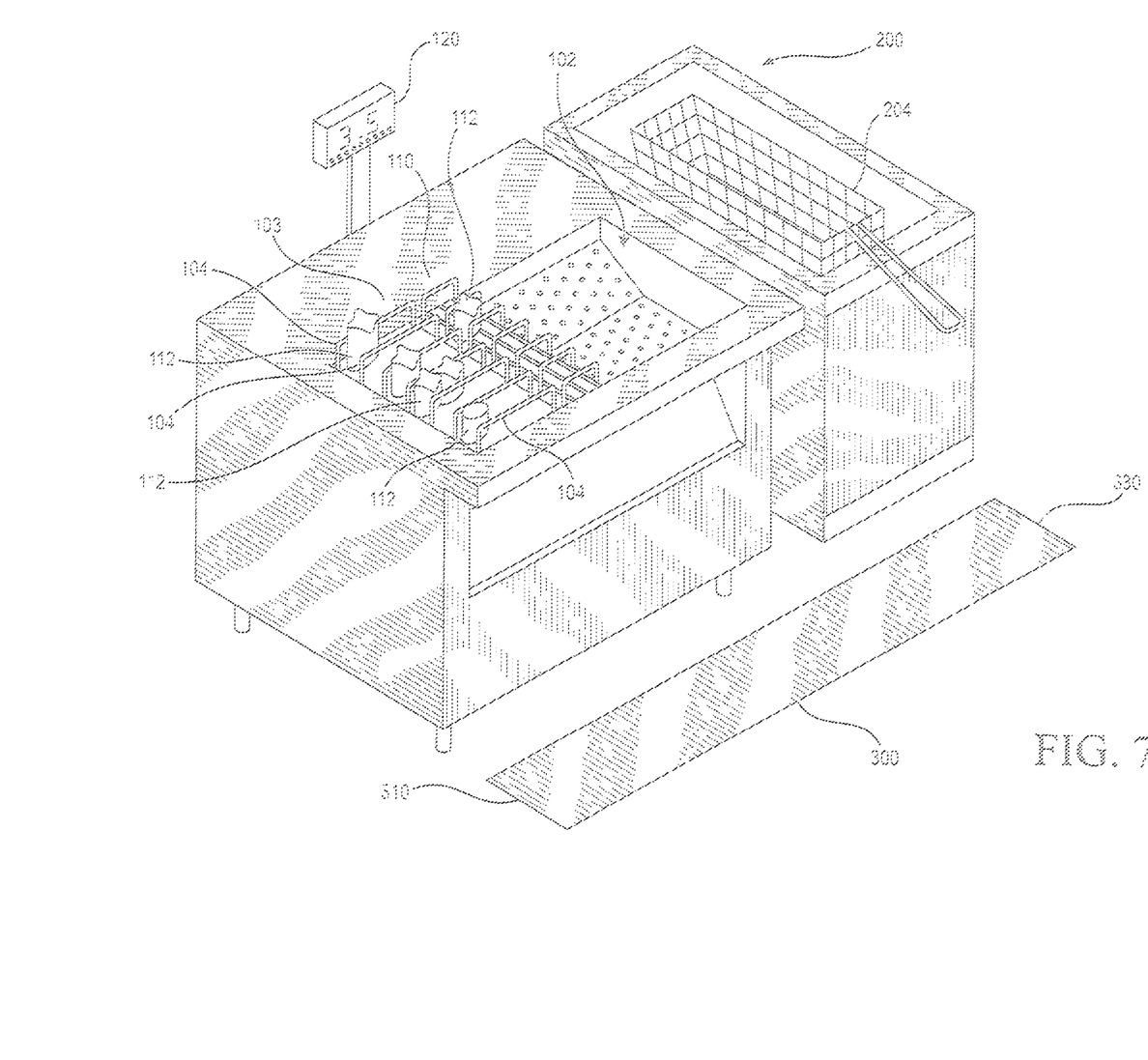
FIG. 7 is a perspective view illustrating the orientation and arrangement of the fry station of FIG. 1 in relation to the comestible cooking apparatus, in accordance with the present invention.
Figure 8:
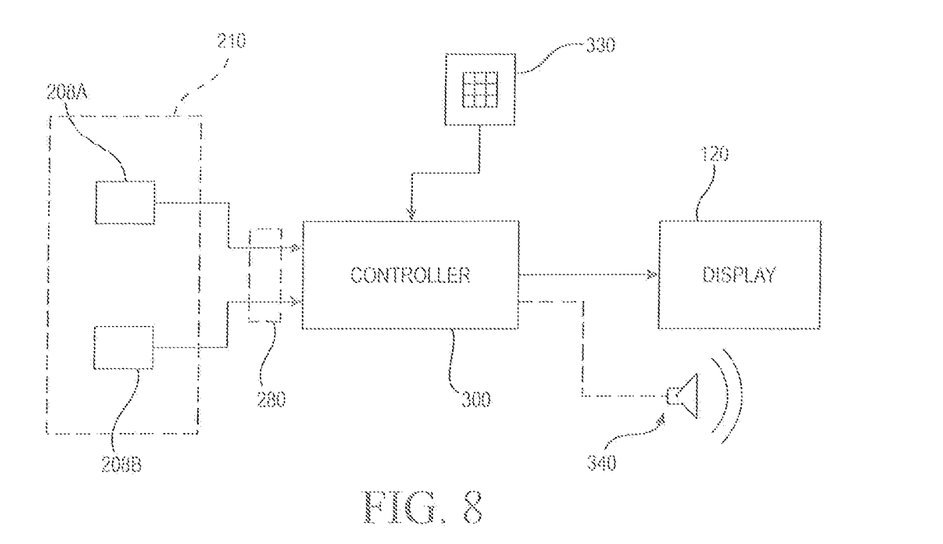
FIG. 8 is a schematic diagram illustrating the signal generation and signal distribution components for the fry station of FIGS. 1-7, in accordance with the present invention.

FIG. 7 shows fry station 100 of this invention positioned proximate to a deep fat fryer 200 including a frying vessel and a basket 204 configured to receive and constrain the comestibles during the frying or cooking process. Deep fat fryer is an exemplary cooker for comestibles, and is suited for cooking large quantities of food. An example of a suitable fryer 200 would be one of the Frialator™ brand fryers such as the model 40S tube-fired gas fryer.

The fry station operator works in an area 300 which spans the lateral distance between the right or raw food input side (near the right side of fryer 200, corresponding to the right edge of the operator's area 320) and the left or portioned food dispensing area (corresponding to the left edge of the operator's area 310), and so there is an efficient lateral progression from placing uncooked comestibles into the cooking apparatus 200 to an accumulation container for cooked comestibles (e.g. fry tub 102), then to portion measuring weighing area (e.g., universal ribbon scale weighing area 150 or 250) and then laterally onto a queuing area (work area 130 of ribbon 103) where the portioned comestibles in their containers await delivery or dispensing to the customer.

Fry ribbon staging or queue area 130 is left-most and the ribbon scale (e.g., 110 or 210) is placed proximate fry ribbon staging area 103 and atop the left portion of fry tub 102, which is uncovered and open on its right side. Fry tub 102 is configured to receive hot comestibles directly from deep fat fryer 200 and is dimensioned to conveniently receive fries when dumped from basket 204. The fries or other comestibles can be seasoned and drained while in fry tub 102.

Fry station 100 has an arrangement which is well suited for use with a deep fat fryer which can be advantageously positioned on the right side of the fry station, proximate the fry tub 102.

The comestibles (e.g., french fries) are preferably served in one of a plurality of designated or selected portion sizes. In the QSR food service environment, the exemplary principals are:

1. Appearance is as important as weight. The container (e.g., bag or box 112M) must always look full;
2. a Small serving can comprise: 2.4 ounces (42 strands of french fries)
3. Regular serving can comprise: 4 ounces (62 strands of french fries)
4. Large serving can comprise: 6 ounces (93 strands of french fries)

In order to permit operators and other QSR personnel to reliably and quickly provide portions of the correct weight, fry ribbon system 100 is preferably configured or assembled with a main body of electronics including one or more load cells and responsive signal processing circuitry configured to receive load cell weight signals from a remotely positioned fry ribbon or fry station holding individual orders of Fries. The load cells or scale (e.g., 110 or 210) transmit weight signals or data to a controller or computer 300 which is programmed to process, store and display the weight data, preferably with color coded display indicator 120, as best seen in FIG. 5, with a further indication that the weight is correct for, e.g., small, medium or large portions. Display 120 will also be energized to indicate that a portion-under-test (e.g., 112UUT) is within the acceptable tolerance or weight range for the designated portion size.

In accordance with the method of the present invention, any portions out of specification or out of the acceptable range can be adjusted by adding or subtracting comestibles (e.g., potato strands) to the portion under test, while observing indicator 120 at the fry station, as the portion rests in the weighing region of ribbon scale (e.g., 110 or 210).

As noted above, the typical fry stations used in restaurants can be one of many different sizes and shapes and the design of fry stations have changed many times over the years and will continue to do so. For any non-conventional designs, a flexible or size-adjustable configuration of the ribbon scale (e.g., 110 or 210) of the present invention would be useful.

As noted above, French fries are an exemplary foodstuff or comestible which is often prepared, cooked or fried before being apportioned or packaged for (hopefully) immediate sale and delivery to the customer, but other comestibles are apportioned and delivered to the customer in a similar way. Thus, the system and method of the present invention is readily adapted for automated apportionment or weighing of individual packaged servings or portions of other comestibles for use in a restaurant or fast food setting. Exemplary other comestibles include fried or baked onion rings, fried or baked popcorn shrimp, steamed shrimp, fried or baked chicken nuggets, fried or baked clam strips, fried or baked corn fritters, fried or baked tater tots and various other foodstuffs which are typically cooked in large quantities before being divided into many individual portions, and after being drained and optionally salted, seasoned or treated with a flavoring agent, powdered coating or the like.

INDUSTRIAL APPLICABILITY

Those having skill in the art will recognize that the system and method of the present invention provide an improved portion control system and an easier and more reliable method for apportioning cooked foods in a commercial food service or quick-service restaurant setting. Broadly speaking, the apparatus of the present invention is a food service portion control system 100 for preparing a plurality of individual portions from comestibles freshly prepared in a large quantity, comprising: a food service preparation and supporting apparatus configured to receive a plurality of single portion containers of comestibles (e.g. 112S, 112M, 112L), wherein the food service preparation surface 130 includes a ribbon scale (e.g., 110 or 210) including container rails or supports (e.g., 154 or 254) and at least one weight sensor (e.g., 208A) which generates a weight signal; the food service preparation and supporting apparatus further includes a controller (e.g., 300) that is responsive to the weight signal and is pre-programmed to compare the portion under test's weight signal to pre-selected weights for individual orders of comestibles in selected portion sizes (as in program 320) and to generate a portion weight status signal for display 120 or audible alarm 340. The ribbon scale supports are configured to support two or more containers or packaged portions of comestibles in a substantially upright orientation and the food service preparation and supporting apparatus further includes an alarm or indicator which an operator can perceive when adding comestibles to a container resting upon ribbon scale to prepare a portion (112UUT). The ribbon scale module (e.g., 110 or 210) is configured to be removably mounted proximate a food service preparation and supporting apparatus queue area 130 including a plurality of parallel transverse rails or supports 104 dimensioned to keep filled containers upright while the ribbon scale's supports (e.g., 154 or 254) are configured to be substantially aligned with queue area supports 104 so that an operator can easily move an upright and filled or portioned container laterally off the ribbon scale surface (150 or 250) and onto the food service preparation and supporting apparatus queue area (left side of 103).

Having described preferred embodiments of a new and improved method and apparatus, it is believed that other modifications, variations and changes will be suggested to those skilled in the art in view of the teachings set forth herein. It is therefore to be understood that all such variations, modifications and changes are believed to fall within the scope of the present invention as set forth in the claims.

What is claimed is:

1. A food service portion control system for preparing a plurality of individual portions from comestibles freshly prepared in a large quantity, comprising:
    a food service preparation and supporting apparatus configured to receive a plurality of single portion containers of comestibles, wherein said food service preparation surface includes a ribbon scale including container supports and at least one weight sensor which generates a weight signal;
    said food service preparation and supporting apparatus further including a controller that is responsive to said weight signal and is pre-programmed to compare said weight signal to pre-selected weights for individual orders of comestibles in selected portion sizes and to generate a portion weight status signal;
    said ribbon scale supports being configured to support two or more containers or packaged portions of comestibles in a substantially upright orientation;
    wherein said food service preparation and supporting apparatus further includes an alarm or indicator which an operator can perceive when adding comestibles to a container resting upon said ribbon scale to prepare a portion; and
    wherein said ribbon scale is configured to be removably mounted proximate a food service preparation and supporting apparatus queue area including a plurality of supports dimensioned to keep filled containers upright; and
    wherein said ribbon scale's supports are substantially aligned with said queue area supports so that an operator can easily move a portioned container from said ribbon scale and onto said food service preparation and supporting apparatus queue area.

2. The food service portion control system of claim 1, wherein said container has an exterior wall and an open top opposite a substantially closed bottom; said container having a selected front to back thickness when filled.

3. The food service portion control system of claim 2, wherein said ribbon scale is configured as a continuous surface with angled wall segments defined therein; and
    wherein said wall segments are configured to define a channel having a width dimensioned to slidably receive said container's front to back thickness.

4. The food service portion control system of claim 2, wherein said ribbon scale is configured as a substantially planar supporting surface with a plurality of transverse rail supports projecting upwardly therefrom; and
    wherein said rail supports are configured to define a channel having a width dimensioned to slidably receive said container's front to back thickness.

5. The food service portion control system of claim 2, wherein said food service preparation and supporting apparatus queue area is configured as a substantially planar supporting surface with a plurality of transverse rail supports projecting upwardly therefrom and configured to define a channel having said width dimensioned to slidably receive said container's front to back thickness.

6. The food service portion control system of claim 5, wherein said ribbon scale's transverse rail supports and channel are substantially aligned with said queue area's transverse rail supports and channel, such that said operator can easily move a portioned container from said ribbon scale's channel onto said food service preparation and supporting apparatus queue area's channel.

7. A method for apportioning comestibles that have been cooked in large quantity for service in portable containers, comprising:
    (a) providing a food service preparation and supporting apparatus configured to receive a plurality of single portion containers of comestibles, wherein said food service preparation surface includes a ribbon scale including container supports and at least one weight sensor which generates a weight signal; said food service preparation and supporting apparatus further including a controller that is responsive to said weight signal and is pre-programmed to compare said weight signal to pre-selected weights for individual orders of comestibles in selected portion sizes and to generate a portion weight status signal; said ribbon scale supports being configured with two or more parallel rows to support two or more containers or packaged portions of comestibles in a substantially upright orientation; wherein said food service preparation and supporting apparatus further includes an alarm or indicator which an operator can perceive when adding comestibles to a container resting upon said ribbon scale to prepare a portion; and wherein said ribbon scale is configured to be removably mounted proximate a food service preparation and supporting apparatus queue area including a plurality of ribbon scale supports dimensioned to keep filled containers upright;
(b) installing said ribbon scale proximate a food service preparation and supporting apparatus queue area so that said ribbon scale's supports are substantially aligned with said queue area supports;
(c) placing a container on said ribbon scale between said ribbon scale container supports;
(d) weighing said container while adding comestibles to said container when on said ribbon scale and between said ribbon scale supports to provide a properly portioned container of comestibles; and
(e) sliding said portioned container from between said ribbon scale supports onto said food service preparation and supporting apparatus queue area and between said queue area supports.

8. The method of claim 7, wherein step (d) further comprises:
(d1) adding comestibles in small increments while observing said indicator, and
(d2) continuously weighing said container while adding the comestibles to said container on said ribbon scale and between said ribbon scale supports until said indicator is perceived to indicate that a properly portioned container of comestibles is provided.

9. The method of claim 7, wherein step (c) further comprises:
(c1) selecting a size-designated container configured for a designated portion size, and
(c2) placing said size designated container on said ribbon scale in a corresponding size-designated row between said ribbon scale container supports.

10. A food service portion control system for preparing a plurality of individual portions from comestibles freshly prepared in a large quantity, comprising:
a fry ribbon scale system including a weighing area with a plurality of ribbon scale supports defining a plurality of container-receiving rows dimensioned to support a container in an upright orientation;
said fry ribbon scale system including a portion weight sensor in each of said weighing area's rows, wherein the weight sensor in each row is configured to weigh an individual order of comestibles in a selected portion size while between said ribbon scale supports, so that a full order or portion is delivered to the customer while avoiding unnecessary loss in excessive portions.

11. The portion control system of claim 10; further comprising:
a food service preparation and supporting apparatus configured to receive a plurality of single portion containers of comestibles;
said food service preparation and supporting apparatus further including a controller that is responsive to said weight sensor and is pre-programmed to compare a weight measurement from said weight sensor to preselected weights for individual orders of comestibles in selected portion sizes and to generate a portion weight status signal;

wherein said food service preparation and supporting apparatus further includes an alarm or indicator which an operator can perceive when adding comestibles to a container resting upon said ribbon scale and between said ribbon scale supports to prepare a portion; and
wherein said scale is configured to be removably mounted proximate a food service preparation and supporting apparatus queue area including a plurality of supports dimensioned to keep filled and weighed containers upright; and
wherein said ribbon scale's supports are substantially aligned with said queue area supports so that an operator can easily move a weighed, portioned container from said ribbon scale and onto said food service preparation and supporting apparatus queue area.

12. The portion control system of claim 11, wherein said container has an exterior wall and an open top opposite a substantially closed bottom; said container having a selected front to back thickness when filled.

13. The portion control system of claim 12, wherein said ribbon scale is configured as a continuous surface with angled wall segments defined therein; and
wherein said wall segments are configured to define a channel having a width dimensioned to slidably receive said container's front to back thickness.

14. The portion control system of claim 12, wherein said ribbon scale is configured as a substantially planar supporting surface with a plurality of transverse rail supports projecting upwardly therefrom; and
wherein said rail supports are configured to define a channel having a width dimensioned to slidably receive said container's front to back thickness.

15. The portion control system of claim 12, wherein said food service preparation and supporting apparatus queue area is configured as a substantially planar supporting surface with a plurality of transverse rail supports projecting upwardly therefrom and configured to define a channel having said width dimensioned to slidably receive said container's front to back thickness.

16. The portion control system of claim 15, wherein said ribbon scale's transverse rail supports and channel are substantially aligned with said queue area's transverse rail supports and channel, such that said operator can easily move a portioned container from said ribbon scale's channel onto said food service preparation and supporting apparatus queue area's channel.

17. The portion control system of claim 15, wherein said ribbon scale is configured as a central element between a bulk food accumulation area or fry tub and said food service preparation and supporting apparatus queue area.

18. The portion control system of claim 17, wherein said ribbon scale is configured as a bridging structure which spans a portion of the opening defining the fry tub, proximate the food service preparation and supporting apparatus queue area.

* * * * *